(12) United States Patent
Klemann

(10) Patent No.: US 8,133,556 B2
(45) Date of Patent: Mar. 13, 2012

(54) DURABLE MULTILAYER INKJET RECORDING MEDIA TOPCOAT

(75) Inventor: Bruce M. Klemann, Shorewood, WI (US)

(73) Assignee: Brady Worldwide, Inc., Milwaukee, WI (US)

( * ) Notice: Subject to any disclaimer, the term of this patent is extended or adjusted under 35 U.S.C. 154(b) by 358 days.

(21) Appl. No.: 12/540,004

(22) Filed: Aug. 12, 2009

(65) Prior Publication Data

US 2011/0039043 A1   Feb. 17, 2011

(51) Int. Cl.
*B41M 5/40* (2006.01)

(52) U.S. Cl. ............... 428/32.21; 428/32.24; 428/32.25; 428/32.26; 428/32.34; 428/32.35; 428/32.37

(58) Field of Classification Search ............... 428/32.21, 428/32.24, 32.25, 32.26, 32.34, 32.35, 32.37
See application file for complete search history.

(56) References Cited

U.S. PATENT DOCUMENTS

| | | |
|---|---|---|
| 2,252,554 A | 8/1941 | Carothers |
| 2,285,009 A | 6/1942 | Brukaker |
| 2,320,088 A | 5/1943 | Leekley |
| 2,388,035 A | 10/1945 | Frosch |
| 2,393,972 A | 2/1946 | Cairns |
| 2,450,940 A | 10/1948 | Cowan et al. |
| 3,157,681 A | 11/1964 | Fischer |
| 3,256,304 A | 6/1966 | Fischer |
| 3,258,443 A | 6/1966 | Cantor |
| 3,380,844 A | 4/1968 | Menikheim et al. |
| 3,394,029 A | 7/1968 | MacArthur |
| 3,579,485 A | 5/1971 | Folzenlogen et al. |
| 3,637,550 A | 1/1972 | Sprauer |
| RE28,533 E | 8/1975 | Drawert et al. |
| 3,931,087 A | 1/1976 | Baatz et al. |
| 3,959,174 A | 5/1976 | Winyall et al. |

(Continued)

FOREIGN PATENT DOCUMENTS

EP   0704560 A1   4/1996

(Continued)

OTHER PUBLICATIONS

W.R. Grace—Coatings Product Overview; http://web.archive.org/web/20070524053130/ http://www.grace.com/EngineeredMate...; Sep. 11, 2010.

(Continued)

*Primary Examiner* — Betelhem Shewareged
(74) *Attorney, Agent, or Firm* — Whyte Hirschboeck Dudek SC

(57) ABSTRACT

Two-layer receiver coatings particularly well adapted for use in inkjet printing comprise:
A. A base layer comprising:
 1. First pigment particles having (a) a number average particle size of 3-25 microns (µm), and (b) at least one of (i) an oil absorption value of at least 150 g oil/100 particles, and (ii) a pore volume of at least about 1.2 cubic meters per gram ($cm^3/g$); and
 2. Water-insoluble binder resin having a surface energy greater than 40 dyne per centimeter (dyn/cm);
 the first pigment particles and water-insoluble binder resin present at a weight ratio of 0.75 to 2; and
B. An imaging layer comprising:
 1. Second pigment particles having (a) a number average particle size of 0.01-4 (µm) aggregated to form an inter-particle region of submicron pores, and (b) a pore volume of 0.4 to 2.2 ($cm^3/g$); and
 2. Water-insoluble binder resin having a surface energy greater than 40 (dyn/cm);
 the second pigment particles and water-insoluble binder resin present at a weight ratio of 0.75 to 2.

16 Claims, 1 Drawing Sheet

U.S. PATENT DOCUMENTS

| | | | |
|---|---|---|---|
| 4,012,560 A | 3/1977 | Baatz et al. | |
| 4,014,645 A | 3/1977 | Chancler et al. | |
| 4,070,421 A | 1/1978 | Etter, Jr. | |
| 4,080,405 A | 3/1978 | Agouri et al. | |
| 4,097,677 A | 6/1978 | Emmons et al. | |
| 4,314,933 A | 2/1982 | Berner | |
| 4,571,267 A | 2/1986 | Drawert et al. | |
| 4,619,956 A | 10/1986 | Susi | |
| 4,780,340 A | 10/1988 | Takahashi et al. | |
| 4,818,325 A | 4/1989 | Hiraiwa et al. | |
| 5,154,760 A | 10/1992 | Miller, Jr. | |
| 5,599,649 A | 2/1997 | Shinkai et al. | |
| 5,882,388 A | 3/1999 | Adair et al. | |
| 6,132,039 A | 10/2000 | Nishimura | |
| 6,261,669 B1 | 7/2001 | Yang et al. | |
| 6,391,427 B1 | 5/2002 | Shaw-Klein et al. | |
| 6,428,157 B1 | 8/2002 | Wen | |
| 6,460,960 B1 | 10/2002 | Mitsuhashi | |
| 6,460,980 B1 | 10/2002 | Hegedus et al. | |
| 6,547,386 B2 | 4/2003 | Bermel et al. | |
| 6,818,685 B1 | 11/2004 | Chapman | |
| 6,863,374 B2 | 3/2005 | Yamazaki et al. | |
| 7,364,636 B2 | 4/2008 | Kronzer | |
| 2002/0004121 A1* | 1/2002 | Branham et al. | 428/195 |
| 2002/0039642 A1 | 4/2002 | Inoue et al. | |
| 2003/0189626 A1 | 10/2003 | Kataoka et al. | |
| 2004/0109959 A1 | 6/2004 | Xu et al. | |
| 2006/0068133 A1 | 3/2006 | Khoultchaev et al. | |
| 2007/0211097 A1 | 9/2007 | Yamazaki et al. | |
| 2007/0235119 A1* | 10/2007 | McManus et al. | 156/60 |
| 2008/0261021 A1* | 10/2008 | Haenen et al. | 428/319.1 |

FOREIGN PATENT DOCUMENTS

| | | |
|---|---|---|
| EP | 0940427 A1 | 9/1999 |
| EP | 1400366 A2 | 3/2004 |
| GB | 1055676 A | 1/1967 |
| GB | 1177199 A | 1/1970 |
| JP | 01-218882 A | 9/1989 |
| JP | 2002-144551 A | 5/2002 |

OTHER PUBLICATIONS

B. Klemann, Correlations between Xenon Arc accelerated weathering tests and Outdoor Weathering, IS&T NIP 19 International Conference on Digital Printing Technologies, 296, 2003.

S. Walheim, et al., Structure Formation Via Polymer Demixing in Spin-Cast Films, Macromolecules, 30 (1997) 4995.

D. Reichel, et al., Anisotropic Porous Substrates for High Resolution Digital Printing, IS&T NIP16 International Conference on Digital Printing Technologies, (2000) 204-207.

Seiji Munekata, Progress in Organic Coatings 16, 1998, 113-134.

* cited by examiner

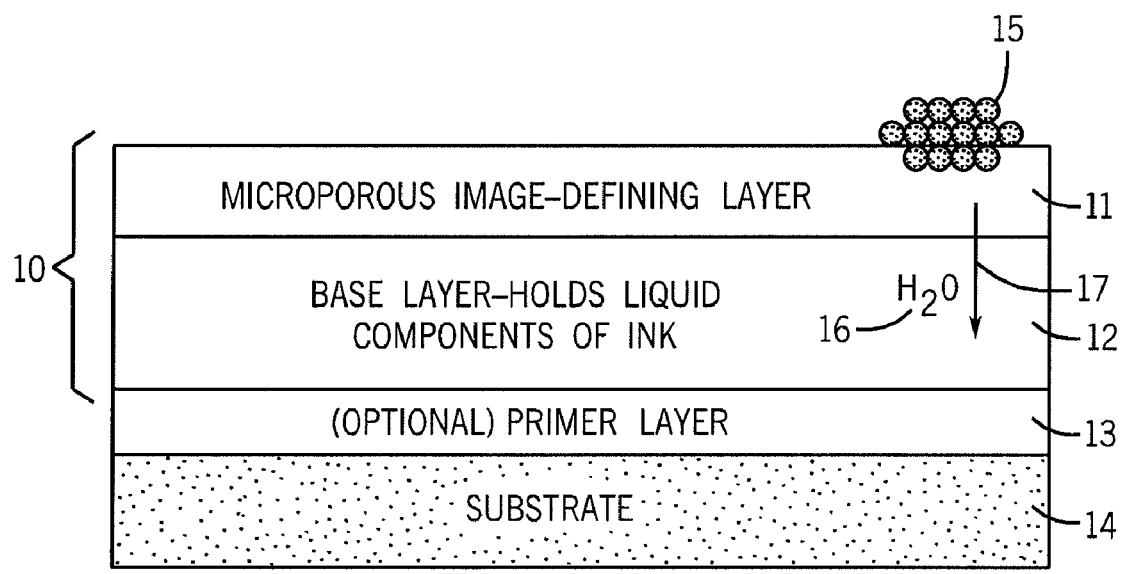

DURABLE MULTILAYER INKJET RECORDING MEDIA TOPCOAT

FIELD OF THE INVENTION

This invention relates to inkjet recording media. In one aspect, the invention relates to a recording media topcoat while in another aspect, the invention relates to labels and signs that incorporate the recording media topcoat.

BACKGROUND OF THE INVENTION

Ink jet printers are a well known means for creating black and white and color images on a recording medium. The images are created by generating small droplets of ink which are propelled onto the recording medium. The ink generally contains a water-based dye or dispersed pigment and the recording medium is often paper, but it may also be a coated polymeric film, e.g., transparencies for overhead projectors. Advantages with this type of printing include the ability to create high-resolution, full-color images rapidly and in large formats using digitally generated and stored images. It is also quiet, environmentally friendly and safe. Inkjet printing, however, is not without certain difficulties In inkjet printing, the ink has to be absorbed as quickly as possible by the recording medium in order to allow the recording medium to be handled soon after the ink has been applied without the ink diffusing or spreading too far through and into the recording medium. Such diffusion and spreading works against the production of images having photographic quality resolution.

Other difficulties with inkjet printing are that the image can lack water and abrasion resistance. These two problems, along with the lack of light fastness of the dyes that are commonly used in inkjet inks, can hinder the application of inkjet printing to products which require outdoor weatherability.

These and other difficulties are successfully addressed by the water-resistant, inkjet recording media topcoat compositions taught in U.S. Pat. No. 5,882,388. The compositions of this patent comprise (a) a binder composition comprising a non-cationic, water-insoluble binder resin having a high surface energy and dissolved or dispersed in an aqueous liquid medium, and (b) hydrophilic pigment particles having a number average particle size in the range from 1-25 microns and an oil absorption of at least 60 grams of oil per hundred grams of particles (g oil/g 100 particles). While the use of the recording media topcoats of this patent produce commercial quality images, a continuing interest exists in identifying recording media topcoats that not only increase the color density of the images, but also increases the definition of the images.

SUMMARY OF THE INVENTION

In one embodiment the invention is a two-layer receiver coating comprising:
A. A base layer comprising:
1. First pigment particles having (a) a number average particle size of 3-25 microns ($\mu$m), and (b) at least one of (i) an oil absorption value of at least 150 g oil/100 particles, and (ii) a pore volume of at least about 1.2 cubic meters per gram ($cm^3/g$); and
2. Water-insoluble binder resin having a surface energy greater than 40 dyne per centimeter (dyn/cm);
the first pigment particles and water-insoluble binder resin present at a weight ratio of 0.75 to 2; and B. An imaging layer comprising:
1. Second pigment particles having (a) a number average particle size of 0.01-4 ($\mu$m) aggregated to form an interparticle region of submicron pores, and (b) a pore volume of 0.4 to 2.2 ($cm^3/g$); and
2. Water-insoluble binder resin having a surface energy greater than 40 (dyn/cm);
the second pigment particles and water-insoluble binder resin present at a weight ratio of 0.75 to 2.

In one embodiment the two-layer receiver coating is an inkjet receiver coating. In one embodiment the first pigment particles are silica particles and the second pigment particles are at least one of silica and alumina particles. In one embodiment the first silica particles have a Mohs hardness of 4-5. In one embodiment the water-insoluble binder resin is crosslinked. In one embodiment at least one of the base and imaging layers further comprises a UV-stabilizer. In one embodiment the base layer has a coating weight of 8-32 grams per square meter ($g/m^2$). In one embodiment the imaging layer has a coating weight of 0.5-1.2 $g/m^3$.

The base layer contains large pigment particles with high pore volume which allows the inkjet media to absorb and hold large quantities of ink. The imaging (top) layer contains small pigment particles and is microporous. This microporosity layer acts as a sieve that keeps the ink pigments on the top of the media while allowing the ink liquids to penetrate into the base layer. This maximizes color density and image definition of the printed images and this, in turn, allows for the printing of linear and 2-dimensional (2-D) bar codes which are not obtainable for most inkjet media.

Both layers contain water-insoluble binder resins that may be crosslinked. The binder resin imparts excellent resistance to water and organic solvents. The binder resins have a high surface energy which facilitates rapid ink absorption. This produces images that are dry to the touch almost immediately after printing.

The inkjet media of this invention is suited to use in both industrial labels and outdoor signs. It has excellent image quality, high color density, bar code printability, strong solvent resistance, strong abrasion resistance and outdoor weathering performance.

BRIEF DESCRIPTION OF THE FIGURE

The FIGURE is a schematic illustration of a two-layer receiver coating over an optional primer which in turn is layered over a substrate.

DETAILED DESCRIPTION OF THE INVENTION

Unless stated to the contrary, implicit from the context, or customary in the art, all parts and percents are based on weight and all test methods are current as of the filing date of this disclosure. For purposes of United States patent practice, the contents of any referenced patent, patent application or publication are incorporated by reference in their entirety (or its equivalent US version is so incorporated by reference) especially with respect to the disclosure of synthetic techniques, definitions (to the extent not inconsistent with any definitions specifically provided in this disclosure), and general knowledge in the art.

The numerical ranges in this disclosure are approximate, and thus may include values outside of the range unless otherwise indicated. Numerical ranges include all values from and including the lower and the upper values, in increments of one unit, provided that there is a separation of at least two units between any lower value and any higher value. As an example, if a compositional, physical or other property, such as, for example, particle size, thickness, etc., is from 100 to 1,000, then all individual values, such as 100, 101, 102, etc., and sub ranges, such as 100 to 144, 155 to 170, 197 to 200, etc., are expressly enumerated. For ranges containing values which are less than one or containing fractional numbers greater than one (e.g., 1.1, 1.5, etc.), one unit is considered to be 0.0001, 0.001, 0.01 or 0.1, as appropriate. For ranges containing single digit numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this disclosure. Numerical ranges are provided within this disclosure for, among other things, particle size, layer thickness, component weight ratios and various process ranges.

"Base layer" and like terms mean the layer of the two-layer receiver coating that is beneath the imaging layer and above the substrate or, if present, the optional primer.

"Imaging layer" and like terms mean the layer of the two-layer receiver coating that is above the base layer and receives the ink from an ink-applicator, e.g., printer.

Recording Media Topcoat

The recording media topcoats of this invention comprise two layers, a base or bottom layer and an imaging or top layer. This is illustrated in the FIGURE in which imaging layer 11 of topcoat 10 is coated onto or otherwise adhered directly to base layer 12. Base layer 12 of topcoat 10 is on top of and in direct contact with optional primer 13 which is on top of and in direct contact with substrate 14. When an aqueous ink comprising pigment 15 and water 16 are brought in contact with the top or exposed surface of imaging layer 1, pigment 15 remains on the surface or gains only modest penetration into imaging layer 11 while water 16 passes through imaging layer 11 into base layer 12 as shown by arrow 17. The water is absorbed and held in base layer 12.

The thickness of the recording media topcoat is such that it provides sufficient absorption capacity. Topcoats that are too thick fail due to binder migration, i.e., the binder in each layer migrates to the surface closest to the ink. This results in a non-uniform distribution of the binder in the respective layers of the topcoat and this, in turn, results in poor printing performance, low adhesion to the substrate, and/or lack of mechanical integrity. Accordingly, the thickness (expressed as coating weight) of the base layer is 8 to 32, preferably 12 to 30 and more preferably 15 to 25, $g/m^2$ while the coating weight of the imaging layer is 0.5 to 12, preferably 1 to 8 and more preferably 1 to 6, $g/m^2$. The thicker the layers, typically the slower the line speed. In general, the thinner the imaging layer, the higher the optical density of the printed image.

The topcoat can be applied to the substrate or support in any manner, conventional or otherwise. Typically the base layer is applied to the substrate, or a primer covering the substrate, by a conventional coating technique, e.g., wire or rod application, spraying, dipping and the like. After the base layer is affixed to the substrate or primer, the imaging layer is applied over the base layer, again typically by a conventional coating technique. Alternatively, the base layer can first be cast or otherwise made as a film and then laminated to the substrate or primer. Likewise, the imaging layer can first be made into a film and then laminated over the base layer. In yet another alternative, the imaging layer can first be affixed to the base layer in any suitable manner, and then the exposed side of the base layer can be affixed, e.g., laminated, to the substrate or primer. The mixture or blend from which the base layer is coated on or otherwise applied to the substrate or primer, and the mixture or blend from which the imaging layer is coated on or otherwise applied to the base layer can be prepared using any conventional mixing or blending technique and equipment.

The binder resin of each layer of the recording media topcoat can be used crosslinked or not crosslinked. For organic solvent resistance and good mechanical performance and weatherability, typically the binder resin is at least partially crosslinked. The binder resin can be crosslinked using any conventional technology, e.g., radiation, heat, moisture, peroxide, etc. Crosslinking can occur before, during or after printing.

Base Layer

The high pore volume of the large pigment particles, along with a high pigment to binder ratio, allows the recording media topcoat to absorb and hold large amount of aqueous inkjet ink liquid. The high surface energy of the binder resin increase the speed of ink absorption (relative to a base layer comprising a binder resin with a lower surface energy) so that prints dry quickly and without puddling or undesirable mixing of colors. The binder resin component imparts water-insolubility, crosslinking of the binder resin imparts organic solvent insolubility, and the hard silica particles impart strong abrasion resistance. The high pore volume of the particles, particularly silica particles, allows the layer to hold a large amount of liquid from the inkjet inks which increases the reflected optical density of the prints. The incorporation of UV stabilizers and the like impart good weatherability.

Imaging Layer

The small pigment particles are used to make the imaging layer microporous so that ink pigments cannot penetrate into the base layer and thus avoid or minimize any contribution that they might make to the reflected optical density of the printed image. Without this imaging layer, the reflected optical density of the printed images would be reduced up to, and possibly exceeding 40 percent. Reflected optical density is typically measured with a densitometer or spectrophotometer accordingly to ISO 5.

The small pigment particles and microporosity of this layer contribute to the image crispness and definition. This, in turn, enables bar code printing. The base layer, like the topcoats of most, if not all, commercially available inkjet media, is not bar code printable, or can only be used to print relatively large bar codes, and this, in turn, makes most, if not all, of them unsuitable for industrial label applications.

Pigment Particles

Since water-resistance is an objective of this invention, the polymeric binder resins used in the practice of this invention do not dissolve in or absorb a significant quantity of water. Consequently, pigment particles with extensive pore structures are used to create porosity in the coating and capacity for holding the water and water-miscible components present in the ink.

If pigment particles are systematically added to a binder, eventually a point is reached at which there is no longer enough binder to fill all of the space between the pigment particles. This is the critical pigment volume concentration or CPVC (T. C. Patton, *Paint Flow and Pigment Dispersion,* 2nd ed., Wiley-Interscience, 1979), a key quantity well known to those skilled in the art. As the ratio of pigment to binder increases above the CPVC, the amount of void space in the coating increases. Thus, the coating must have void space above the CPVC in order to be absorptive if the binder is not absorptive. The pigment particle to binder resin ratio both in the base and imaging layers of this invention is in the range of 0.75 to 2. For the base layer, this ratio is preferably in the range of 0.85 to 1.2. For the imaging layer, this ratio is preferably in the range of 0.9 to 2.

Regarding the base layer, the pigment particles used in the practice of this invention have a large absorption capacity which is commonly defined by their oil absorption value. The pigment particles have an oil absorption value greater than (>) 150, preferably >250 and more preferably >300, g oil/100 g pigment particles. In one embodiment the oil absorption value correlates to a specific pore volume of at least 1.2, preferably at least 1.5 and more preferably at least 1.8, cm$^3$/g. Generally, the higher the oil absorption, the more preferred the pigment although as a practical matter, the oil absorption value does not exceed 3 cm$^3$/g. The method for measuring the oil absorption value is set forth in ASTM D281-95. For the imaging layer, the pigment particles can have a pore volume as small as 0.5 cm$^3$/g, preferably a pore volume in the range of 0.5 to 2.2 cm$^3$/g.

There are no other specific limitations on the pigment or other absorptive particles employed in the practice of this invention. Many different absorptive inorganic pigments are identified in the paper coating literature. These materials include calcium carbonate, precipitated silica, fumed silica, silica gel, alumina, boehmite, pseudo-boehmite (U.S. Pat. No. 5,104,730), aluminum hydroxide, basic magnesium carbonate and amorphous magnesium carbonate. Sol-gel coatings obtained by hydrolysis of alkoxides of silicon or aluminum are another class of materials suitable for use in this invention. Preferred materials are sometimes referred to as "flatting agents".

In one embodiment the pigment particles comprise silica. Silica particles for use in the base layer include, but are not limited to, Syloid C803, Syloid C805, Syloid C807, Syloid C809, Syloid C812, Syloid C816, Sylojet P405, Sylojet P407, Sylojet P409, Sylojet P412, Sylojet P416, Syloid W300, Syloid W500, Syloid 74, Syloid 234, Syloid 620, Syloid 4500, Syloid 5500, Syloid 6000 and Syloid 6500 all available from W. R. Grace; Sylysia 250, Sylysia 250N, Sylysia 270, Sylysia 290, Sylysia 310P, Sylysia 320, Sylysia 350, Sylysia 370, Sylysia 380, Sylysia 390, Sylysia 420, Sylysia 430, Sylysia 440, Sylysia 450, Sylysia 460, and Sylysia 470, all available from Fuji Sylysia; and Gasil HP220, Gasil HP39, and Gasil IJ45 available from Ineos Silicas. Preferred pigments for the base layers include Syloid C805, Syloid C807, Syloid C809, Syloid C812, Sylojet P405, Sylojet P407, Sylojet P409, Sylojet P412, Syloid W500, Sylysia 320, and Sylysia 350.

Silica particles for use in the imaging layer include, but are not limited to, Sylojet A25, Sylojet C30, Sylojet 710A, Sylojet 710C, Sylojet C803, and Sylojet P403 available from W. R. Grace; and Sylysia 310P, Sylysia 320, Sylysia 350, Sylysia 420, Sylysia 530 available from Fuji Sylysia. Two particularly preferred pigments for the base layer are Syloid C812 and Sylojet P412 which have an oil absorption value of 320 g oil/100 g pigment particles and a mean particle size of 12 microns (measured by laser diffraction). Preferred pigments for the imaging layer include Sylojet A25, Sylojet C30, Sylojet 710A, Sylojet 710C, Sylysia 310P, Sylysia 320, and Sylysia 350. In general, silicas with large particle size and narrow particle size distribution give coatings with more inter-particle void space and better ink absorption than silicas with small particle size and/or broad particle size distribution.

In one embodiment the pigment particles of the imaging layer comprise alumina. The boehmite type of hydrated alumina is particularly useful. Boehmite alumina particles for use in imaging layer includes, but is not limited to, Aeropal 65, Dispal 8F4, Dispal 10F4, Dispal 11N7-80, Disperal 20, Disperal 40, Disperal 60, Disperal 18HP, Disperal HP 14, Disperal HP 14/2 and Dispersal HP 18 available from Sasol. Notwithstanding their lack any significant internal pore volume, particles of fumed aluminum oxide, fumed silica and fumed mixed-oxide can be used in the practice of this invention. Fumed aluminum oxide, fumed silica and mixed-oxide particles for use in an imaging layer include, but are not limited to, Aerodisp WK341, Aerodisp WK440, Aerodisp WK 630, Aerodisp WK7330 and Aerodisp WK7330N available from Evonik Degussa.

One method for selectively producing high, e.g., 1.2 to 3.0 cm$^3$/g, pore volume silica gel is described in U.S. Pat. No. 3,959,174. The method uses alkaline gelation to control the silicate concentration. It uses a de-solubilizing substance such as ammonium hydroxide, sodium sulfate or other such salt to decrease the solubility of silica. The silica concentration is maintained at 3 to 15 percent, the silica to de-solubilizing agent ratio at 2 to 20, and the gelation pH at 10.6 to 11.2. The gelled silica is then aged, neutralized, filtered, optionally aged a second time, and washed. For use in this invention the preferred values are in the range of 8 to 12 percent, more preferably 10 percent, for $SiO_2$ and the $SiO_2/NH_3$ ratio is in the range of 4 to 8, preferably 6. After washing and filtering and prior to re-slurrying, the silica is dried. This may be oven drying or spray drying. This drying forms particle agglomerates of greater than 25 microns. The agglomerated silica is fed into a fluid energy mill, preferable of the micronizer or jet pulverizer type. When the particles are at a predetermined size. e.g., 1 to 25 microns, they are collected from the mill.

For the pigment particles used in the base layer, the number average particle size is 3 to 25, preferably 4 to 16, microns. For the pigment particles used in the imaging layer, the number average particle size is 0.01 to 4, preferably 0.1 to 3, microns. Number average particle size is measured by dynamic light scattering over a range of 1 micron to hundreds or thousands of microns using such equipment as the Horiba LA-950V2.

Binder Resins

The binder resins of this invention have surface energies greater than (>) 40, preferably >42, dyne/cm. As the surface energy of the coating increases, the spreading coefficient, which may be defined as the decrease in free energy as the surface is covered with a film of liquid (see S. Wu, *Polymer Interface and Adhesion*, Marcel Dekker, 1982), increases. Physically this means that the rate of ink spread on the substrate increases. The increase in coating surface energy manifests itself in color print density increases due to greater spread, or "dot gain", of the jetted ink droplets on the surface and increases in the rate of ink absorption as the ink spreads more rapidly into the capillaries of the porous coating. Swift ink absorption not only allows the print to be handled as soon as it comes off the printer, but for some wide-format ink jet printers the ink must dry within a few seconds or it will be smeared by handling or by rollers in the paper feed systems that may be only a few inches away from the print-head.

The surface energy of a flat film of binder resin is measured by ASTM D2578-08. This test employs mixtures of formamide and ethyl CELLOSOLVE™ (ethylene glycol monoethyl ether available from The Dow Chemical Company) over the range of 30-56 dyn/cm. Test kits are available from Diversified Enterprises under the name AccuDyne Test Surface Tension Test Fluids.

Alcohol-Soluble Binder Resins

In one embodiment of this invention, the binder resin comprises a non-cationic, alcohol-soluble, water-insoluble compound dissolved in an alcoholic liquid medium. In this embodiment the binder resin is preferably soluble to a concentration of at least 5 weight percent (wt %) in the alcohol or alcohol mixture used to prepare the recording media coating composition.

The alcoholic liquid medium has a boiling point less than 150° C., preferably less than 140° C., more preferably less than 120° C., and has a viscosity of up to 100 MegaPascals (MPa), preferably up to 50 MPa. The alcohols are not a solvent for the support or substrate to which the coating composition is applied, although they may swell the support to some extent. Suitable alcohols include hydrocarbon compounds having at least one carbon atom and at least one hydroxy group. They can have a wide range of carbon atoms and hydroxy groups. Preferably, however, the alcohol has less than 15 carbon atoms and less than 4 hydroxy groups. These alcohols may have other hetero atoms besides those contributed by the hydroxy group(s), and these groups can be primary, secondary or tertiary to the hydrocarbon moiety such as their valence allows so long as it does not become a solvent for the support.

Due to the polar nature of most binder resins, polar hydrocarbon liquids with hydroxyl groups are preferred alcoholic liquid media. Straight chain primary and secondary alcohols ranging from 1 to 6 carbon atoms in length, such as methanol, ethanol, propanol, n-butanol, 2-butanol, isopropanol, and so forth, are preferred. Tertiary alcohols such as diacetone alcohol are also appropriate. Glycol ethers such as diethylene glycol monobutyl ether, ethylene glycol monobutyl ether and propylene glycol monomethyl ether may also be included in the composition as alcoholic liquid media. The solvent composition of the coating composition may include up to 40 percent water and minor amounts of other organic solvents.

One preferred class of suitable alcohol-soluble binder resins are alcohol-soluble polyamides. Typical alcohol-soluble polyamides and methods of obtaining them are disclosed in U.S. Pat. Nos. 2,285,009; 2,320,088; 2,388,035; 2,393,972; 2,450,940 and 3,637,550. Preferred alcohol-soluble polyamides include alcohol-soluble melt-polymerized polyamides consisting essentially of recurring carboxamido groups and at least two different species of recurring hydrocarbylene groups selected from the group consisting of aliphatic and alicyclic groups of 2 to 40 carbon atoms as integral parts of the main polymer chain, and having at least 3 different recurring polyamide repeat units.

Preferred among such polyamides are those in which (a) 33-100 mole percent (mol %) of the imine groups are derived from polymethylene diamine of 6 to 20 carbons, (b) 5-65 mol % of the carbonyl groups are derived from dimerized fatty acids of 16 to 48 carbon atoms, (c) 8-65 mol % of the carbonyl groups are derived from polymethylene diacid of 6 to 18 carbon atoms, and (d) 8-65 mol % of the carbonyl groups are derived from monomers selected from the group consisting of (1) polymethylene diacid of 6 to 18 carbon atoms which is different from diacid (c), and (2) polymethylene omega-amino acid of 6 to 18 carbon atoms. These polyamides have an annealed heat of fusion of 5 to 18 calories per gram, are quenchable to the amorphous state at a cooling rate of 100° C. per minute, and have an upper glass transition temperature in the amorphous state of less than 30° C.

One particularly preferred class of polyamides includes those in which (1) 98-100 mol % of the imine groups are derived from hexamethylene diamine, (b) 15-55, and preferably 25-55, mol % of the carbonyl groups are derived from dimerized fatty acid of 36 carbon atoms, (c) 10-45, and preferably 15-45, mol % of the carbonyl groups or derived from adipic acid, and (d) 15-55, and preferably 15-45, mol % of the carbonyl groups are derived from polymethylene diacid of 10 to 12 carbon atoms. Most preferably, these polyamides have a minimum flow temperature of 160 to 210° C.

Suitable polymethylene diamines for preparing suitable polyamides include hexamethylene diamine, heptamethylene diamine, octamethylene diamine, nonamethylene diamine, decamethylene diamine, undecamethylene diamine, dodecamethylene diamine, tridecamethylene diamine, and octadecamethylene diamines. Suitable polymethylene diacids for preparing suitable polyamides include adipic, pimelic, suberic, azelaic, sebacic, dodecanedioic, brassylic, tetradecandioic and octadecanedioic acids. Suitable amino acids include 6-aminocaproic, 7-aminoheptanoic, 8-aminocaprylic, 9-aminononanoic, 10-aminodecanoic, 11-aminoundecanoic, 17-aminoheptadecanoic, and the like.

By "dimerized fatty acid of 16 to 48 carbons" is meant dimers derived from fatty acids of 8 to 24 carbons. These dimerized fatty acids are commercially available materials which have been fully described in the literature including U.S. Pat. Nos. 3,157,681 and 3,256,304. These dimerized fatty acids are obtained by catalytic or non-catalytic polymerization of ethylenically unsaturated fatty acids.

The method of forming polyamides by melt-condensation is well known to those skilled in the art. This polymerization reaction is described, for example, in U.S. Pat. Nos. 2,252,554 and 2,285,009 and British Patent 1 055 676. The reaction is carried out by polyamide-forming derivatives, and, if desired, amino acids or their polyamide-forming derivatives at temperatures of about 150 to 300° C. while driving off water and continuing the reaction until the desired molecular weight is obtained. The resulting polyamide contains substantially equimolar amounts of carbonyl groups and imine groups. The polymer end groups are carboxylic acid and amine, one of which may be in slight excess depending upon which reactant was present in excess. Preferably the polymer contains at least as many amine ends as carboxyl ends.

These polyamides and their method of manufacture are described in more detail in U.S. Pat. No. 3,637,550. Specific examples of this type of polyamide include ELVAMIDE® nylon terpolymer resins available from E.I. DuPont de Nemours, Inc., and custom nylon terpolymer resin solutions available from General Plastics Corporation. Preferred binder resins include ELVAMIDE 8023, ELVAMIDE 8061, ELVAMIDE 8061A, ELVAMIDE 8061M and ELVAMIDE 8066. Particularly preferred binder resins are solutions of ELVAMIDE® 8063 nylon terpolymer in blends of low molecular weight aliphatic alcohols and water.

Additional preferred alcohol-soluble polyamides are those prepared by condensing a monocarboxylic acid, diamine and dimerized fatty acid as described in U.S. Pat. No. Re. 28,533; those prepared by condensing an acid component of dimerized fatty acids, at least one aliphatic unbranched monocarboxylic acid, and at least one aliphatic branched monocarboxylic acid with ethylene diamine and hexamethylene diamine as the amine component as described in U.S. Pat. No. 4,571,267; and those polyamide resin compositions that comprise the condensation reaction product of a $C_{36}$ dimerized fatty acid, at least one dibasic acid, at least one $C_{1-4}$ alkyl diamine and at least one piperazine-like diamine, the equivalents of amine groups being substantially equal to the equivalents of carboxyl groups, where 30 to 50 equivalent percent of the carboxyl groups are contributed by the dibasic acid component and 73 to 93 equivalent percent of the amine groups are contributed by the piperazine-like diamine component as described in U.S. Pat. No. 5,154,760. Specific examples of this type of polyamide resin include the UNI-REZ® fatty acid dimer-based polyamides developed by Union Camp Corporation.

Dispersed Binder Resins

In one embodiment of this invention, the binder resin composition is a dispersion of a non-cationic water-insoluble binder resin in an aqueous or alcoholic liquid medium. The alcoholic medium may be selected from among those described above as solvents for the resins which are soluble in alcoholic liquid media. The aqueous or alcoholic medium may be a mixture of an alcoholic medium with an aqueous media, and it may further comprise minor amounts of non-alcoholic organic solvents. In one embodiment the binder resin is an aqueous dispersion of a non-cationic water-insoluble polyamide. Aqueous polyamide dispersions that are useful in this invention include custom nylon terpolymer dispersions available from General Plastics Corporation under the GENTON trademark, and MICROMID fatty acid dimer-based polyamide dispersions available from Arizona Chemical.

Polyamides suitable for making aqueous dispersions include polymerized fatty acid polyamide resins which have been prepared so as to have a low acid and low amine number. The dispersion is typically prepared by heating the polyamide resin to a temperature at or above its melting point. The liquefied polymerized fatty acid polyamide resin is then blended with a predetermined amount of water which is heated to a temperature such that the resulting blend will have a temperature above the melting point of the polyamide resin. A surfactant, which may be anionic, nonionic or cationic, preferably nonionic, and which will promote the emulsification of the polyamide resin in water, is included in the mixture. The resulting mixture is then subjected to sufficient comminuting forces to form an emulsion in which droplets of the polyamide resin have a volume average size distribution of 20 microns or less in diameter and preferably 5 microns or less. The resulting emulsion is then cooled to a temperature below the melting point of the polyamide resin causing the emulsified droplets of the polyamide resin to solidify as finely divided particles which are dispersed uniformly through the aqueous phase. The resulting aqueous dispersion is stable. This type of binder resin composition is described in U.S. Pat. No. 5,109,054.

Dispersions of many other binder resins with surface energies greater than 42 dyn/cm are also useful in the practice of this invention. These resins include ethylene-acrylic acid (EAA) copolymers, ionomers, copolymers of poly-2-ethyl-2-oxazoline and acrylates, and polyurethanes. Preferred resins include EAA copolymer dispersions sold by Michelman, Inc under the MICHEM PRIME trademark, EAA copolymers sold by The Dow Chemical Company under the PRIMACOR trademark, EAA copolymer ionomer dispersions sold by Michelman, Inc under the MICHEM PRIME trademark, and polyurethanes sold under the WITCOBOND trademark. Particularly preferred resin dispersions include MICHEM PRIME 48525 ionomer, MICHEM PRIME 4893R EAA copolymer, MICHEM PRIME 4893-40R EAA copolymer, MICHEM PRIME 489345N ionomer, MICHEM PRIME 4990R copolymer, WITCOBOND W-213 polyurethane, and WITCOBOND W-240 polyurethane.

Crosslinking Agents

In one embodiment, the binder resins are crosslinked in order to improve solvent resistance. For some of the binder resins useful in this invention, crosslinking may also improve water resistance. For polyamide resins, one preferred class of crosslinking agent is aziridine. One particularly preferred crosslinking agent is XAMA®-7 tri-functional aziridine from BASF. Preferably the EAA copolymer and ionomer resins, copolymers of poly-2-ethyl-2-oxazoline and acrylates, and polyurethanes are crosslinked with aziridine, isocyanate or melamine formaldehyde resin in order to obtain sufficient solvent resistance. Preferred crosslinking agents for these resins include XAMA®-7 tri-functional aziridine from BASF, CYMEL® 385 and 373 partially alkylated melamines from Cytec Industries; RESIMENE® 717, 718, 741, 745, and 747 partially alkylated melamines from Ineos Melamines; BAYHYDUR 302, 303, 304, 305, 401-70, BL5335, VP LS 2150 BA, VP LS 2306, VP LS 2310, XP 2487/1, XP 2547, XP 7165 isocyanates from Bayer Material Science; and BASONAT HB 100, HI 100, HB 175 MP/X, and HB 275 B isocyanates from BASF. In some cases the melamine formaldehyde resins may require an acid catalyst such as p-toluene sulfonic acid. In some cases, the isocyanates may require the use of organometallic catalysts for initiation such as dibutyltin dilaurate.

Topcoat Additives

The topcoat formulation can include one or more additives that impart beneficial properties to the topcoat. These properties may be particularly preferred when the image-bearing recording media is exposed to environmental conditions that are deleterious to the integrity of the image.

One such environmental condition is exposure to short wavelength radiation, such as the ultraviolet radiation contained in sunlight. Ultraviolet radiation is known to cause photochemical damage to coatings and color images, such as structural damage and fading or darkening of colors. Additives which are known to protect against degradation by ultraviolet radiation are generally classified as UV absorbers, light stabilizers and antioxidants. These additives are used in the manner and amounts as is well known in the art.

Examples of UV absorbers include compounds classified as derivatives of hydroxybenzotriazole, hydroxybenzophenone, and triazines, such as hydroxylphenyl-s-triazines. Specific examples include TINUVIN™ 1130 from Ciba (a mixture of poly(oxy-1,2 ethanediyl), .α-(3-(3-(2H-benzotriazol-2-yl)-5-(1,1-dimethylethyl)-4-hydroxyphenyl)-1-oxopropyl)-ω-hydoxy and poly(oxy-1,2 ethanediyl), α-(3-(3-(2H-benzotriazol-2-yl)-5-(1,1-dimethylethyl)-4-hydroxyphenyl)-1-oxopropyl)-ω-(3-(3-(2H-benzotriazol-2-yl)-5-(1,1-dimethylethyl)-4-hydroxyphenyl)-1-oxopropoxy); TINUVIN 384 from Ciba, benzenepropanoic acid, 3-(2H-benzotriazol-2-yl)-5-(1,1-di-methylethyl)-4-hydroxy-, C7-9 branched an linear alkyl esters; TINUVIN 400 from Ciba, a mixture of 2-[4-[(2-hydroxy-3-dodecyloxypropyl)oxy]-2-hydroxyphenyl]-4,6-bis(2,4-dimethylphenyl)-1,3,5-triazine and 2-[4-[(2-hydroxy-3-tridecyloxypropyl)oxy]-2-hydroxyphenyl]-4,6-bis(2,4-dimethylphenyl)-1,3,5-triazine; TINUVIN 460 from Ciba, 2,4-bis(2-hydroxy-4-butoxyphenyl)-6-(2,4-bis-butoxyphenyl)-1,3,5-triazine; Tinuvin 477DF hydroxyl-phenyl-triazine from Ciba; CYASORB™ UV 24 from Cytec (a hydroxybenzophenone UV absorber); and CYASORB™ UVI164 also from Cytec (a UV absorber of the substituted s-triazine class).

The UV stabilizers are typically hindered amine light stabilizers (HALS). Specific examples include TINUVIN™ 123, 292 and 770 and CHIMASSORB™. 119 and 944FL, all from Ciba.

The antioxidants which are useful in the topcoat formulations of the present invention may be selected from a wide range of compounds, such as the phenolic antioxidants, e.g., hindered mono-phenols, diphenols, and poly-phenols, and phosphites and phosphonites. Examples of the phenolic antioxidants include the IRGANOX™ series from Ciba, such as IRGANOX™ 1098, and an example of the phosphite type antioxidant is IRGAFOS 168, also from Ciba. Interactions of the antioxidants with other components of the formulations may, however, form colored compounds in reactions with many crosslinkers, and thus may be unsuitable for certain formulations.

Further examples of UV absorbers, stabilizers and antioxidants that may be used as additives to the topcoat compositions according to this invention may be found in Chapter 2 of *Oxidation Inhibition in Organic Materials* (CRC Press, 1990, J. Pospisil et al., eds., pp. 29-162), entitled "Photo-oxidation of Polymers and its Inhibition" by Francois Gugumus; *Modern Plastics Encyclopedia Handbook* (McGraw Hill, 1994); "UV Stabilizer" by Pyong-Nae Son, pp. 119-120; European Patent Application 0 704,560; and U.S. Pat. Nos. 4,314,933 and 4,619,956.

Polyamide-based topcoats, when UV-stabilized with an additive package, are especially suitable for applications requiring outdoor weatherability in which a high degree of water-resistance is required. Additives appropriate to polyamides include s-triazine and hydroxy benzotriazole UV absorbers, hindered amine light stabilizers, and phenolic and phosphite antioxidants. Best results are usually obtained when a combination of UV absorbers and hindered amines, are used as the combinations are often synergistic.

An advantage of ink jet media with the polyamide-based topcoats of this invention relative to the prior art is that no over-lamination, heating, exposure to UV light or an electron beam, or other post-treatment is required after printing as the media has strong resistance to UV light, water and a large range of solvents. However, the porous media will lack stain resistance, so it may still be desirable for some applications to apply a clear coating or pressure-sensitive over-laminate to impart stain resistance. Of course, many of the clear coatings and over-laminates will also enhance the weathering performance and abrasion resistance of this inkjet media. The polyamides may be coated either from solution in alcohols and alcohol/water mixtures or in the form of aqueous dispersions.

Supports

The coating compositions of this invention can be used on a variety of supports, including paper, polymer-coated paper, synthetic paper, polymer-coated fabric or mesh, vinyl (such as cast vinyl or calendared vinyl), polyethylene, polypropylene, polyester (such as polyethylene terephthalate), polystyrene, etc. The advantages of this invention are particularly pronounced with regard to supports having low surface energy, low porosity and/or a generally poor ability to absorb and adhere to inkjet inks. Supports that have good weatherability are preferred in those applications in which weatherability is a criterion.

The surface of a low surface energy support, such as nearly any of the commercially manufactured polymer supports mentioned above, is often treated to raise its surface energy and provide polar groups which can hydrogen bond to attain good adhesion between the support and the binder. To render these support materials improved in adhesiveness, surface treating methods are known which comprise subjecting the substrates to flame treatment, corona discharge treatment, irradiation treatment or oxidizing treatment with a bichromate, sulfate or the like so as to produce polar groups such as a carbonyl group on the surface of the substrates. However, such treatments need special equipment and are complicated to carry out.

Another approach is to coat the support with a primer which comprises a polar polymer having a surface energy intermediate between that of the support and that of the coating composition. Acrylic polymers, polyurethane polymers and mixtures of acrylic and polyurethane polymers are preferred, particularly when they are in the form of an aqueous dispersion. A primer may be applied at low coat weights, such as in the range of 1 to 4 g/m$^2$ dry weight.

Certain chlorinated polymers can also be employed as primers to enhance the bonding of materials to untreated polyolefin surfaces. Chlorinated mixtures of a hydrocarbon resin and polyethylene are taught in U.S. Pat. No. 4,070,421 for use as primers and paint and ink additives for improving adhesion of coatings to polyolefin. Chlorinating carboxyl-group-containing polyolefins to form primer coatings for untreated polyolefin substrates is taught in U.S. Pat. No. 3,579,485. Still further, U.S. Pat. No. 3,380,844 teaches the coating of polyolefin film by a polymer of vinylidene chloride, a (meth)acrylate ester and (meth)acrylic or itaconic acid.

Polymers other than chlorinated polymers have also been adhered to polyolefins. U.S. Pat. No. 4,080,405 teaches a process for chemical modification of polyolefins by grafting polar monomers onto the polyolefin by means of a free radical generating material to produce a polyolefin surface having improved wettability. U.S. Pat. No. 3,394,029 teaches the coating of polyolefin surfaces by polymers of certain terpene acrylates and N-terpene acrylamides for improved adhesion of conventional lacquer topcoats. U.S. Pat. No. 4,014,645 teaches the enhancement of dye receptivity of polyolefin materials used in fabric manufacture by coating the polyolefin with a self-curing polymeric binder containing a quaternary ammonium salt. U.S. Pat. No. 4,097,677 discloses certain radiation curable coatings, useful to coat some polyolefins; the coatings comprising monomeric unsaturated esters of glycol monodicyclopentenyl ethers. In British Patent. 1 177 199 nonwoven webs are disclosed containing a major amount of polypropylene fibers bonded with binder comprising vinyl acetate, ethylene and an unsaturated N-methylol amide or an alkyl ether of it. U.S. Pat. No. 3,258,443 describes a latex which may be used to deposit a pressure-sensitive adhesive on polyethylene and polypropylene. The latex is prepared from 1 to 45% vinyl acetate, 50 to 98% of an alkyl acrylate having an alkyl group of between 4 and 10 carbon atoms (several acyclic alkyl groups are named) and 1 to 5% of an unsaturated carboxylic acid. U.S. Pat. Nos. 3,931,087 and 4,012,560 teach the use of copolymers of a sulfonic acid and esters of acrylic or methacrylic acids as pressure sensitive adhesives which are adherent to a number of surfaces including polyethylene and polypropylene.

U.S. Pat. No. 4,818,325 describes a useful primer which comprises at least one organometallic compound and at least one organic polymer and is used in bonding non-polar or highly crystalline resin substrates together or bonding another material to the resin substrate with the use of a 2-cyanoacrylate.

Polyurethane resins may also be used as primers. The polyurethane resins include thermoplastic polyurethane resins and thermosetting polyurethane resins. In addition, the polyurethane resins include modified polyurethane resins as far as it mainly comprises polyurethane resins. However, in order to give a high adhesive capacity and a high elasticity to a paint film, thermoplastic polyurethane resins having a mean number average molecular weight (Mn) of 2,000 to 10,000, preferably 4,000 to 7,000, are used. Such resins are described in U.S. Pat. No. 4,780,340 for making additional primers.

Alternative Uses

The recording media topcoat of this invention works especially well as a recording media for inkjet printing with aqueous-based inks of labels, signs and wide-format graphics, but it is capable of receiving and absorbing many different forms of liquid inks in various printing processes. Other liquid inks include nonaqueous-based or mixed aqueous and nonaqueous-based inks and UV-curable inks, any or all applied by water-borne flexo-printing or letterpress. The recording media topcoat of this invention can also be used in thermal transfer printing.

The invention is described more fully through the following examples. Unless otherwise noted, all parts and percentages are by weight.

EXAMPLES

Example 1

Materials

White, 2-mil MELINEX® 329 polyester film available from DuPont Teijin Films was used as the substrate. It was coated at a coat weight of 3.2 g/m² with the primer formulation reported in Table 1.

TABLE 1

Primer Formulation

| Component | Weight (g) |
| --- | --- |
| NeoRez R-967 Polyurethane Dispersion | 34 |
| Joncryl 617 Acrylic Emulsion | 34 |
| Di-ionized Water | 32 |
| Total | 100 |
| % Solids | 29.1 |

NeoRez R-967 polyurethane dispersion is available from DSM NeoResins.
Joncryl 617 acrylic emulsion is available from BASF.

The primer was coated with a base layer by a slot die at a dry coat weight of 11 lb/ream (17.9 g/m²). The formulation of the base layer is reported in Table 2.

TABLE 2

Base Layer Formulation

| Component | Weight (g) |
| --- | --- |
| C812 Silica Dispersion (Table 3) | 54.08 |
| 26% ELVAMIDE ® 8063 Solution (Table 4) | 40.5 |
| UV Stabilizer Subformula (Table 5) | 4.95 |
| Xama-7 Aziridine Crosslinker | 0.47 |
| TOTAL | 100 |
| % Solids | 21.7 |
| Pigment:Binder Ratio | 0.90 |

Xama-7 aziridine crosslinker is available from BASF.

TABLE 3

18.4% Syloid C812 Silica Dispersion

| Component | Weight (g) |
| --- | --- |
| Methanol | 32 |
| n-Propanol | 32 |
| Di-ionized Water | 16 |
| Syloid C812 Silica Gel (92% Solids) | 20 |
| TOTAL | 100 |

Syloid C812 Silica Gel is available from W. R. Grace.

TABLE 4

26% ELVAMIDE ® 8063 Resin Solution

| Component | Weight (g) |
| --- | --- |
| Methanol | 24.6 |
| n-Propanol | 24.6 |
| n-Butanol | 10 |
| Di-ionized Water | 14.8 |
| 26% ELVAMIDE ® 8063 Polyamide Terpolymer Resin | 26 |
| TOTAL | 100 |

26% ELVAMIDE ® 8063 polyamide terpolymer resin is available from E. I. DuPont de Nemours, Inc.

TABLE 5

UV Stabilizer Subformula

| Component | Weight (g) |
| --- | --- |
| Methanol | 39.4 |
| n-Propanol | 39.4 |
| TINUVIN 1130 Benzotriazole | 17 |
| CHIMASSORB 944 | 4.2 |
| TOTAL | 100 |

TINUVIN ® 1130 benzotriazole is a UV absorber available from Ciba.
CHIMASSORB ® 944 is a hindered amine stabilizer available from Ciba.

The base layer was coated with an imaging layer by a #8 Mayer rod at a dry coat weight of 2.2 lb/ream (3.6 g/m²). The formulation of the base layer is reported in Table 6.

TABLE 6

Imaging Layer Formulation

| Component | Weight (g) |
| --- | --- |
| Methanol | 19.46 |
| n-Propanol | 19.46 |
| Di-ionized Water | 9.72 |
| Fuji Sylysia SY 310 Silica Gel | 9.19 |
| ELVAMIDE ® 8063 Solution (Table 4) | 32.12 |
| UV Stabilizer Subformula (Table 5) | 4.95 |
| Xama-7 Aziridine Crosslinker | 0.51 |
| Methanol | 3.67 |
| Di-ionized Water | 0.92 |
| TOTAL | 100 |
| % Solids | 18.7 |
| Pigment:Binder Ratio | 1.05 |

Example 2

The same substrate, primer layer and base layer were used as in Example 1. For the imaging layer, the formulation in Table 7 was used. The methanol was added very slowly with stirring to the Sylojet 710A aqueous silica dispersion to avoid precipitation. The ELVAMIDE® 8063 resin solution and UV Stabilizer Subformula were then stirred in, and the Xama-7 crosslinker was added just before the formulation was coated with a #6 Mayer rod for a dry coating weight of 1.5 g/m².

TABLE 7

Imaging Layer Formulation 2

| Component | Weight (g) |
| --- | --- |
| Sylojet 710A silica dispersion | 24.80 |
| Methanol | 51.42 |

TABLE 7-continued

Imaging Layer Formulation 2

| Component | Weight (g) |
|---|---|
| ELVAMIDE ® 8063 Solution (Table 4) | 18.64 |
| UV Stabilizer Subformula (Table 5) | 4.94 |
| Xama-7 Aziridine Crosslinker | 0.20 |
| TOTAL | 100 |
| % Solids | 10.1 |
| Pigment:Binder Ratio | 1.05 |

Example 3

The substrate, primer layer, and base layer of Example 1 were used. The imaging layer formulation is detailed in Table 8. The methanol was added very slowly with stirring to the Sylojet 710A aqueous silica dispersion to avoid precipitation. The ELVAMIDE® 8063 resin solution and UV Stabilizer Subformula were then stirred in. Dispal 11N7-80 boehmite alumina powder was added while the mixture was stirred with a Cowles blade at high speed for 30 min. The Xama-7 crosslinker was added just before the formulation was coated with a #6 Mayer rod to give a dry coating weight of 1.8 g/m$^2$.

TABLE 8

Imaging Layer Formulation 3

| Component | Weight (g) |
|---|---|
| Sylojet 710A silica dispersion (20.5%) | 24.80 |
| Methanol | 48.88 |
| ELVAMIDE ® 8063 Solution (Table 4) | 18.64 |
| UV Stabilizer Subformula (Table 5) | 4.94 |
| Xama-7 Aziridine Crosslinker | 0.20 |
| Dispal 11N7-80 alumina | 2.54 |
| TOTAL | 100 |
| % Solids | 12.1 |
| Pigment:Binder Ratio | 1.47 |

Dispal 11N7-80 is a boehmite alumina powder available from Evonik Degussa.

Example 4

Melinex 329 white polyethylene terephthalate (PET) 2 mil in thickness was used. The formulation in Table 9 was mixed with an overhead mixer, drawn down with a #34 Mayer rod onto the PET, and cured for 2 min in a forced-air oven at 90° C. to give a dry coating weight of 22.6 g/m$^2$.

TABLE 9

Base Layer Formulation 4

| Component | Weight (g) |
|---|---|
| 20% dispersion of Syloid C812 in 80/20 methanol/DI water | 61.98 |
| MICHEM PRIME 4990R ethylene/acrylic acid copolymer dispersion | 37.02 |
| TINUVIN 477 DW triazine UV absorber | 0.50 |
| Xama-7 Aziridine Crosslinker | 0.50 |
| TOTAL | 100 |
| % Solids | 26.2 |
| Pigment:Binder Ratio | 1.00 |

MICHEM PRIME 4990R is an ethylene/acrylic acid copolymer available from Michelman, Inc.
TINUVIN 477DW is a triazine UV absorber available from Ciba.

The base layer was then coated with the Imaging Layer Formulation 4 shown in Table 10. Imaging Layer Formulation 4 was drawn down with a #4 Mayer rod and cured for 2 min in a forced-air oven at 120° C. to give a dry coating weight of 2.6 g/m$^2$.

TABLE 10

Imaging Layer Formulation 4

| Component | Weight (g) |
|---|---|
| Sylojet 710A silica dispersion (20.5%) | 65.24 |
| MICHEM PRIME 4990R ethylene/acrylic acid copolymer dispersion | 33.26 |
| TINUVIN 477 DW triazine UV absorber | 0.50 |
| Xama-7 Aziridine Crosslinker | 0.50 |
| TOTAL | 100 |
| % Solids | 25.3 |
| Pigment:Binder Ratio | 1.20 |

Example 5

Example 5 illustrates the inapplicability to this invention of a binder resin with a surface energy of less than 40 dyn/cm. For the formulations of both the base and imaging layers, the silica was first mixed with DI water to form a slurry. The binder resin was added next, and the aziridine crosslinker was added just before the coating was drawn down. The base layer (Table 11) was drawn down onto 3 mil white Melinex 329 PET with a #34 Mayer rod; the imaging layer was drawn down onto the base layer with a #6 Mayer rod. Both layers were cured for 2 min at 130° C. in a forced-air oven.

TABLE 11

Base Layer Formulation 5

| Syloid W500 silica gel | 12.30 |
|---|---|
| DI water | 49.16 |
| NeoCryl A-1049 | 36.05 |
| Xama-7 | 2.49 |
| TOTAL | 100.00 |
| % Solids | 27.1 |
| Pigment:Binder Ratio | 1.00 |

TABLE 12

Imaging Layer Formulation 5

| Syloid W300 silica gel | 12.30 |
|---|---|
| DI water | 49.16 |
| NeoCryl A-1049 | 36.05 |
| Xama-7 | 2.50 |
| TOTAL | 100.00 |
| % Solids | 27.1 |
| Pigment:Binder Ratio | 1.00 |

Example 6

The formulation in Table 13 illustrates the effects of the use of a water-soluble polymer as the binder resin for the top layer of an inkjet receiver coating. This formulation was drawn down with a #12 Mayer rod over the base layer of Example 1 for testing.

TABLE 13

Imaging Layer Formulation 6 with Water-Soluble Polymer

| | |
|---|---|
| Sylojet A25 silica gel | 53.60 |
| Viviprint 200 | 44.40 |
| RESIMENE 717 | 2.00 |
| TOTAL | 100.00 |
| % Solids | 28.7 |
| Pigment:Binder Ratio | 1.0 |

Example 7

The formulation in Table 14 illustrates the effects of the use of non-absorptive silica in the top layer of an inkjet receiver coating. This formulation was drawn down with a #12 Mayer rod over the base layer of Example 1 for testing.

TABLE 14

Imaging Layer Formulation with Non-Absorptive Pigment

| | |
|---|---|
| Sylojet 4000C silica dispersion | 26.43 |
| 26% Elvamide 8063 Resin Solution (Table 4) | 40.65 |
| UV Stabilizer Subformula (Table 5) | 5.50 |
| Methanol | 21.14 |
| Deionized water | 5.28 |
| Xama-7 aziridine | 1.00 |
| TOTAL | 100.00 |
| % Solids | 23.1 |
| Pigment:Binder ratio | 1.0 |

Test Methods and Grading of Samples

Reflected Optical Density of Prints

Color blocks of the primary (cyan, magenta, yellow, black) were printed at 100% ink laydown in Corel Draw 11. Color blocks of the secondary colors (red, green, blue), were also printed in this software application. When possible, for the different printers, color management was turned off to maximize the ink laydown. The reflected optical densities of the blocks were measured using a Gretag Macbeth D19C densitometer with ANSI Status T filters. For the primary colors, only a single density was measured. For the secondary colors, two densities were measured (magenta and yellow for red, cyan and yellow for green, cyan and magenta for blue). For each material, an overall average density for all seven colors was computed. The numerical averages were converted to grades according to the following scale: >1.30=A; 1.20-1.29=B; 1.10-1.19=C; 1.00-1.09=D; <1.00=F.

Linear Bar Code Printing

Code 39 linear bar codes were printed at element sizes on an Epson Stylus C88+ set for Text & Image mode (720 dots per inch or dpi). The bar codes were then scanned using a QuickCheck 800 bar code verifier. Codes receiving an overall ANSI grade of A or B, with modulation excluded, were considered to pass. When printed at 720 dpi, the bar code quality for many types of inkjet media degrades when the number of dots per element (narrow bars) is about six, so the data tables below compare bar code grades for six-dot bar codes (at 720 dpi, this is equivalent to a narrow bar width of 8.3 mil).

Solvent Resistance

Printed blocks of primary and secondary colors were subjected to the following solvent dip and rub test: Four cycles of 10 min immersion followed by 30 min removal; one last cycle of 10 min immersion, followed immediately by 10× double-rub test with cotton swab soaked in the solvent (double-rub=rub back and forth with light pressure applied to the swab). Thirteen solvents were tested: deionized water, isopropanol, methyl ethyl ketone, acetone, toluene, mineral spirits, gasoline, JP-8 jet fuel, brake fluid, Skydrol 500B-4 hydraulic fluid, SAE 20 wt oil, 3% aqueous Alconox solution, and a 10% sulfuric acid solution. For each of the solvents, the amount of damage to the printed image was graded as one of the following: no visible effect (3 points), slight effect (2 points), moderate effect (1 point), or severe effect (0 points). The grades for the thirteen solvents were added up and averaged. As a metric, these numerical averages were converted to grades according to the following scale: >2.24=A; 2.00-2.24=B; 1.75-1.99=C; 1.50-1.74=D; <1.50=F.

Accelerated Weathering

Color blocks of the primary (cyan, magenta, yellow, black) were printed at 100% ink laydown in Corel Draw 11. Color blocks of the secondary colors (red, green, blue), were also printed in this software application. When possible, for the different printers, color management was turned off to maximize the ink laydown. The reflected optical densities of the blocks were measured using a Gretag Macbeth D19C densitometer with ANSI Status T filters. For the primary colors, only a single density was measured. For the secondary colors, two densities were measured (magenta and yellow for red, cyan and yellow for green, cyan and magenta for blue). For each material, an overall average density for all seven colors was computed. Samples with printed color blocks were placed in an Atlas Ci5000 Xenon Arc Weather-Ometer and tested using ASTM G155, Cycle 1. The reflected optical densities of the color blocks samples were monitored for 800 hr, which is believed to be approximately equivalent to one year outdoors in Milwaukee, Wis., USA (Reference: B. Klemann, "Correlations between Xenon Arc accelerated weathering tests and Outdoor Weathering", IS&T NIP 19 International Conference on Digital Printing Technologies, 396, 2003.) For each color, the ratio of the average reflected optical density after 800 hr to the initial reflected optical density was calculated. The averages were graded according to the following scale: >0.849=A; 0.700-0.849=B; 0.550-0.649=C; 0.400-0.549=D; <0.400=F.

Abrasion Resistance

A black patch 10 cm×10 cm in size was printed at 100% ink laydown. The patch of printed media was then mounted on an aluminum plate and tested on a Taber Abraser, using a CS-10 abrasive wheel with 500 g weights hung from the two arms attached to the abrasive wheels. The black reflected optical density was measured periodically at eight points around the circular patch that was ground into the media with the abrasive wheels. The test was terminated when the average black reflected optical density of the eight points was reduced to 70% of the initial average black reflected optical density. The number of cycles to the endpoint were graded according to the following scale: >500=A; 250-499=B; 100-249=C; 50-99=D; <50=F.

Test Results and Comparisons

The materials of the examples cited above are compared to several types of commercially-available wide-format inkjet graphics media and photo media in Table 15. The material from U.S. Pat. No. 5,882,388 is also included, to show the increase in performance due to the presence of the imaging layer in this invention. Examples 1-4 illustrate the performance benefits when this invention is practiced according to the limits described in the claims. Examples 5-7 illustrate how the performance deteriorates when an inappropriate binder resin or absorptive pigment is employed in the coating formulation.

TABLE 15

Print Quality and Durability of Inkjet-Printed Media

| No. | Material | Printer | Optical Density Grade | Linear Bar Code Grade | Solvent Resistance Grade | Accelerated Weathering Grade | Abrasion Test Grade |
|---|---|---|---|---|---|---|---|
| 1 | U.S. Pat. No. 5,882,388 | Epson Stylus C88+ | F | C | C | B | C |
| 2 | Example 1 | Epson Stylus C88+ | C | B | A | B | A |
| 3 | Example 2 lab sample | Epson Stylus C88+ | A | A | A | C | A |
| 4 | Example 2 Production equipment | Epson Stylus C88+ | B | A | A | C | A |
| 5 | Example 3 | Epson Stylus C88+ | C | B | A | C | A |
| 6 | Example 4 | Epson Stylus C88+ | C | C | A | B | A |
| 7 | Example 5 | Epson Stylus C88+ | F | F | A | NT | A |
| 8 | Example 6 | Epson Stylus C88+ | C | C | F | F | F |
| 9 | Example 7 | Epson Stylus C88+ | C | F | C | C | C |
| 10 | Competitive Wide-Format Media A | Epson Stylus C88+ | A | C | D | C | D |
| 11 | Competitive Wide-Format Media B | Epson Stylus C88+ | A | B | D | F | D |
| 12 | Competitive Wide-Format Media C | Epson Stylus C88+ | A | C | D | B | D |
| 13 | Competitive Photo Media D | Epson Stylus C88+ | A | B | D | F | F |
| 14 | Competitive Photo Media E | Epson Stylus C88+ | A | B | F | F | F |
| 15 | U.S. Pat. No. 5,882,388 | Epson PX-6250S* | F | NT | C | B | C |
| 16 | Example 1 | Epson PX-6250S* | D | NT | A | A | A |
| 17 | Example 2 lab sample | Epson PX-6250S* | B | NT | A | B | A |
| 18 | Example 2 Production equipment | Epson PX-6250S* | C | NT | A | B | A |
| 19 | Example 3 | Epson PX-6250S* | D | NT | A | B | A |
| 20 | Example 4 | Epson PX-6250S* | C | NT | A | A | A |
| 21 | Competitive Wide-Format Media A | Epson PX-6250S* | C | NT | D | C | D |
| 22 | Competitive Wide-Format Media B | Epson PX-6250S* | C | NT | D | F | D |
| 23 | Competitive Wide-Format Media C | Epson PX-6250S* | B | NT | D | B | D |
| 24 | Competitive Photo Media D | Epson PX-6250S* | A | NT | D | F | F |
| 25 | Competitive Photo Media E | Epson PX-6250S* | B | NT | F | F | F |
| 26 | Example 1 | Lexmark X9350 | C | NT | A | C | A |
| 27 | Example 2 Production equipment | Lexmark X9350 | B | NT | A | D | A |
| 28 | Competitive Photo Media F | Lexmark X9350 | B | NT | D | F | F |
| 29 | Example 1 | Epson Stylus C88+ | B | B | A | A | A |
| 30 | Example 2 Production equipment | Epson Stylus C88+ | A | B | A | A | A |
| 31 | Example 3 | Epson Stylus C88+ | C | NT | A | A | NT |
| 32 | U.S. Pat. No. 5,882,388 | Canon i550 (dye-based ink) | B | NT | F | F | A |

*Epson DURABrite Ultra cyan, magenta, and black inks, with non-commercial yellow ink
Stain-resistant coating from co-pending patent application applied at coating weight of 3.7 g/m².
NT = not tested As seen from Table 15, the materials of this invention (Examples 1-4) perform well in all of the tests. Their printed optical density and bar code grades are superior to those of the material from U.S. Pat. No. 5,882,388. In comparison, the competitive wide-format inkjet samples are observed to lack solvent resistance, weathering performance, and abrasion resistance, and some have weak bar code performance. The competitive photo media samples have excellent print density and image acuity, but are completely lacking in solvent resistance, weathering performance, and abrasion resistance.

The performance of the materials of this invention can be improved further by the post-print application of a stain-resistant overcoat. Printed image density, weathering performance, and abrasion resistance can all be increased.

The inkjet inks used have significant effects on the performance of the printed media. The ink set used with the Epson PX-6250S printer is the most lightfast, while the ink set for the Lexmark X9350 is the least lightfast. All three of the ink sets used above are aqueous, pigmented inkjet inks. In order to realize the high performance illustrated above for the media of this invention, the use of pigmented inks is preferred since dyes are soluble and are less lightfast than pigments. Line 32 in Table 15 is indicative of the general performance level obtainable with dye-based inkjet inks.

Suitability for Other Printing Technologies

The media of this invention may be used with more than just aqueous inkjet inks. Since the resistance to organic solvents and glycol ethers is strong, solvent-based and UV curable inkjet inks do not damage these topcoats, and can be used for printing.

In addition to inkjet printers, the media of this invention may be used to record images produced by other printing technologies. It is receptive to electrophotographic toners used in laser printing and to the inks used to impregnate dot matrix ribbons. Test results with these technologies are shown in Table 16. The grades for reflected optical density of color prints are for the same test procedure and grading scheme as outlined above for inkjet print testing. For the monochrome printers, the black density alone has been graded on the same scale.

TABLE 16

Tests Results from Alternative Printing Technologies

| Number | Material | Printer | Average Optical Density - Colors | Optical Density Grade - Black |
|---|---|---|---|---|
| 33 | Example 2 - Production Equipment | Lexmark T644 Monochrome Laser | | A |
| 34 | Example 2 - Production Equipment | Lexmark C920 Color Laser | 0.87 | A |
| 35 | OfficeMax Copy Paper SKU# 06000374 | Lexmark C920 Color Laser | 0.89 | B |
| 36 | Example 2 - Production Equipment | Brady SLV-DAT-PTR Dot Matrix with R5000 ribbon | | A |

For both the monochrome and color laser printers, the edge acuity was sufficient to print readable text with an 8 pt Times New Roman font. The reflected optical densities of images were excellent for black blocks. For color blocks printed on a Lexmark C920 Color Laser, the reflected optical densities were lower than those obtainable in inkjet printing, but were approximately equal to the densities obtained when the same file was printed onto a standard grade of copy paper. The black reflected optical density was also quite high for the dot matrix print test. These results indicate that this invention may be used to create a multi-technology digital imaging recording topcoat.

Although the invention has been described with certain detail through the preceding specific embodiments, this detail is for the primary purpose of illustration. Many variations and modifications can be made by one skilled in the art without departing from the spirit and scope of the invention as described in the following claims.

What is claimed is:

1. A two-layer receiver coating comprising:
   A. A base layer comprising:
      1. First pigment particles having (a) a number average particle size of 3-25 microns (μm), and (b) at least one of (i) an oil absorption value of at least 150 g oil/100 particles, and (ii) a pore volume of at least about 1.2 cubic centimeters per gram ($cm^3/g$); and
      2. Water-insoluble binder resin having a surface energy greater than 40 dyne per centimeter (dyn/cm);
      the first pigment particles and water-insoluble binder resin present at a weight ratio of 0.75 to 2; and
   B. An imaging layer comprising:
      1. Second pigment particles having (a) a number average particle size of 0.01-4 (μm) aggregated to form an inter-particle region of submicron pores, and (b) a pore volume of 0.4 to 2.2 $cm^3/g$; and
      2. Water-insoluble binder resin having a surface energy greater than 40 (dyn/cm);
      the second pigment particles and water-insoluble binder resin present at a weight ratio of 0.75 to 2.

2. The receiver coating of claim 1 in which the first and second pigment particles are at least one of silica and alumina.

3. The receiver coating of claim 1 in which the first pigment particles are silica.

4. The receiver coating of claim 3 in which the first pigment particles have a Mohs hardness of 4-5.

5. The receiver coating of claim 1 in which the water-insoluble binder resin of the base layer is the same as the water-insoluble binder resin of the imaging layer.

6. The receiving coating of claim 1 in which the water-insoluble binder resin in both the base and imaging layers is crosslinked.

7. The receiver coating of claim 1 in which at least one of the base and imaging layers further comprises a UV stabilizer.

8. The receiver coating of claim 1 in which the base layer has a coating weight of 8-32 $g/m^2$.

9. The receiver coating of claim 1 in which the imaging layer has a coating weight of 0.5-1.2 $g/m^2$.

10. The receiver coating of claim 1 in which the pigment particles of the imaging layer comprise at least one of a boehmite type of hydrated alumina.

11. The receiver coating of claim 1 in which the water-soluble binder resin of both the base and imaging layers comprises a non-cationic, alcohol-soluble, water-insoluble compound dissolved in an alcoholic liquid medium.

12. The receiver coating of claim 1 in which the water-soluble binder resin of both the base and imaging layers comprises an alcohol-soluble, melt-polymerized polyamide consisting essentially of recurring carboxamido groups and at least two different species of recurring hydrocarbylene groups selected from the group consisting of aliphatic and alicyclic groups of 2 to 40 carbon atoms as integral parts of the main polymer chain, and having at least 3 different recurring polyamide repeat units.

13. The receiver coating of claim 1 in which the water-soluble binder resin of both the base and imaging layers is an aqueous dispersion of a non-cationic, water-insoluble polyamide.

14. The receiver coating of claim 1 on a support.

15. The receiver coating of claim 14 in which the support is one of paper, polymer-coated paper, synthetic paper, polymer-coated fabric or mesh, vinyl, polyethylene, polypropylene, polyester and polystyrene.

16. The receiver coating of claim 1 bearing an image printed by at least one of an aqueous inkjet, solvent inkjet, UV-curable inkjet, laser and dot matrix printer.

* * * * *